(12) United States Patent
Zenasni et al.

(10) Patent No.: US 12,516,258 B2
(45) Date of Patent: *Jan. 6, 2026

(54) PHOSPHOROUS-FREE OIL SOLUBLE MOLYBDENUM COMPLEXES FOR HIGH TEMPERATURE NAPHTHENIC ACID CORROSION INHIBITION

(71) Applicant: Ecolab USA Inc., St. Paul, MN (US)

(72) Inventors: Oussama Zenasni, Houston, TX (US); Philip Andrew Thornthwaite, Wigan (GB); Maria Dejesus Marquez, Houston, TX (US); John Nathan Scholz, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 72 days.

This patent is subject to a terminal disclaimer.

(21) Appl. No.: 18/650,514

(22) Filed: Apr. 30, 2024

(65) Prior Publication Data

US 2024/0279561 A1  Aug. 22, 2024

Related U.S. Application Data

(62) Division of application No. 17/443,591, filed on Jul. 27, 2021, now Pat. No. 12,006,483.

(60) Provisional application No. 63/058,010, filed on Jul. 29, 2020.

(51) Int. Cl.
C10G 7/10         (2006.01)
C10G 75/02        (2006.01)
C23F 11/16        (2006.01)

(52) U.S. Cl.
CPC ............... *C10G 75/02* (2013.01); *C10G 7/10* (2013.01); *C23F 11/16* (2013.01)

(58) Field of Classification Search
CPC ........... C23F 11/00; C23F 11/04; C23F 11/08; C23F 11/10; C23F 11/16; C23F 11/161; C23F 11/162; C23F 11/65; C23F 11/185; C10G 7/10; C10G 75/00; C10G 75/02; C10G 75/04; C09K 8/54; C09K 2208/32; C07F 11/005; C10N 2030/10; C10N 2030/12

See application file for complete search history.

(56) References Cited

U.S. PATENT DOCUMENTS

| | | | |
|---|---|---|---|
| 3,356,702 A | 12/1967 | Farmer et al. | |
| 3,446,735 A | 5/1969 | Weise | |
| 3,522,093 A | 7/1970 | Woolman | |
| 4,024,050 A | 5/1977 | Shell et al. | |
| 4,024,051 A | 5/1977 | Shell et al. | |
| 4,226,700 A | 10/1980 | Broom | |
| 4,298,454 A | 11/1981 | Aldridge et al. | |
| 4,370,221 A | 1/1983 | Patmorre et al. | |
| 4,428,848 A | 1/1984 | Levine et al. | |
| 4,511,405 A | 4/1985 | Reed et al. | |
| 4,542,253 A | 9/1985 | Kaplan et al. | |
| 4,551,227 A | 11/1985 | Porter et al. | |
| 4,559,152 A | 12/1985 | Schlicht | |
| 4,582,543 A | 4/1986 | Bretz | |
| 4,613,372 A | 9/1986 | Porter et al. | |
| 4,941,994 A | 7/1990 | Zetlmeisl et al. | |
| 5,000,836 A | 3/1991 | Forester | |
| 5,015,358 A | 5/1991 | Reed et al. | |
| 5,055,174 A * | 10/1991 | Howell ................ | B01J 31/226 |
| | | | 502/220 |
| 5,182,013 A | 1/1993 | Petersen et al. | |
| 5,252,254 A | 10/1993 | Babaian-Kibala | |
| 5,314,643 A | 5/1994 | Edmondson et al. | |
| 5,445,749 A | 8/1995 | Hong | |
| 5,552,085 A | 9/1996 | Babaian-Kibala | |
| 5,630,964 A | 5/1997 | Babaian-Kibala et al. | |
| 5,631,213 A | 5/1997 | Tanaka et al. | |
| 5,863,415 A | 1/1999 | Zetlmeisl | |
| 5,906,968 A * | 5/1999 | McConnachie ...... | C10M 159/18 |
| | | | 556/38 |
| 6,022,835 A | 2/2000 | Fletcher | |
| 6,207,625 B1 | 3/2001 | Ogano et al. | |
| 6,228,253 B1 | 5/2001 | Gandman | |
| 6,258,760 B1 | 7/2001 | Ozaki et al. | |
| 6,852,213 B1 | 2/2005 | Tong | |
| 7,311,144 B2 | 12/2007 | Conrad | |
| 7,727,942 B2 | 6/2010 | Wormuth et al. | |
| 7,763,744 B2 | 7/2010 | Tynik et al. | |
| 7,989,404 B2 | 8/2011 | Habeeb et al. | |
| 8,092,618 B2 | 1/2012 | Sharpe et al. | |
| 8,247,539 B2 | 8/2012 | Revel et al. | |
| 8,309,041 B2 | 11/2012 | Lott et al. | |
| 9,023,193 B2 | 5/2015 | Koseoglu | |

(Continued)

FOREIGN PATENT DOCUMENTS

CN   1164867 A   11/1997
CN   101697038 A   4/2010

(Continued)

OTHER PUBLICATIONS

Brown et al. ("Studies of molybdenum and tungsten thiolates", Journal of the Chemical Society, Dalton Transactions 12, 1973, 1311-1315) (Year: 1973).*
Babaian-Kibala (1994) "Phosphate ester inhibitors solve naphthenic acid corrosion problems", Oil & Gas Journal, 92 (9), 9 pages, (Abstract).
De Feo, et al. (2017) "Formation of interfacial molybdenum carbide for DLC lubricated by MoDTC: Origin of wear mechanism", Wear, 370-371:17-28.
C. Grossiord, et al. (1998) "M0S2 single sheet lubrication by molybdenum dithiocarbamate", Tribology International, 31(12):737-743.
C. Grossiord, et al. (1998) "In situ MoS2 formation and selective transfer from MoDPT films", Surface and Coatings Technology, 108-109:352-359.

(Continued)

*Primary Examiner* — Matthew R Diaz
(74) *Attorney, Agent, or Firm* — Kagan Binder, PLLC

(57) ABSTRACT

Disclosed are sulfur-containing molybdenum complexes used in compositions and methods for inhibiting or reducing high temperature corrosion in petroleum refineries.

18 Claims, No Drawings

(56) References Cited

U.S. PATENT DOCUMENTS

| | | | |
|---|---|---|---|
| 9,090,837 | B2 | 7/2015 | Subramaniyam |
| 9,115,319 | B2 | 8/2015 | Subramaniyam |
| 9,206,361 | B2 | 12/2015 | Chabot et al. |
| 9,233,359 | B2 | 1/2016 | Borremans et al. |
| 9,605,215 | B2 | 3/2017 | Lott et al. |
| 9,663,743 | B2 | 5/2017 | Griffin et al. |
| 9,790,440 | B2 | 10/2017 | Chang |
| 9,845,437 | B2 | 12/2017 | Savage et al. |
| 9,890,339 | B2 | 2/2018 | Subramaniyam |
| 9,951,290 | B2 | 4/2018 | Gao et al. |
| 10,712,105 | B1 | 7/2020 | Christensen et al. |
| 11,697,756 | B2 | 7/2023 | Gul et al. |
| 11,767,596 | B2 | 9/2023 | Zenasni et al. |
| 2001/0001804 | A1* | 5/2001 | Skledar ............ C10M 105/04 208/18 |
| 2007/0298505 | A1 | 12/2007 | Smith et al. |
| 2009/0176671 | A1 | 7/2009 | Ozaki et al. |
| 2010/0116718 | A1 | 5/2010 | Subramaniyam |
| 2010/0152073 | A1 | 6/2010 | Nelson et al. |
| 2010/0152074 | A1 | 6/2010 | Nelson et al. |
| 2011/0160405 | A1 | 6/2011 | Subramaniyam |
| 2014/0020645 | A1 | 1/2014 | Guinther et al. |
| 2014/0100148 | A1 | 4/2014 | Yagishita |
| 2016/0362619 | A1 | 12/2016 | Subramaniyam |
| 2017/0240838 | A1 | 8/2017 | Casey et al. |
| 2018/0100117 | A1* | 4/2018 | Flores-Torres ..... C10M 169/042 |
| 2018/0100120 | A1* | 4/2018 | Flores-Torres ....... C10M 171/02 |
| 2019/0225909 | A1 | 7/2019 | Miller et al. |
| 2019/0264125 | A1 | 8/2019 | Iino et al. |
| 2022/0017836 | A1 | 1/2022 | Isa et al. |
| 2022/0033725 | A1 | 2/2022 | Zenasni et al. |
| 2022/0033977 | A1 | 2/2022 | Gul et al. |
| 2023/0303908 | A1 | 9/2023 | Gul et al. |
| 2024/0287397 | A1 | 8/2024 | Gul et al. |

FOREIGN PATENT DOCUMENTS

| | | | |
|---|---|---|---|
| CN | 102575353 | A | 7/2012 |
| CN | 104730602 | A | 6/2015 |
| CN | 105482869 | A | 4/2016 |
| CN | 106010480 | A | 10/2016 |
| CN | 108698027 | A | 10/2018 |
| DE | 2840094 | A1 | 3/1980 |
| EP | 0267674 | A1 | 5/1988 |
| EP | 0727429 | A2 | 8/1996 |
| EP | 0768366 | A1 | 4/1997 |
| EP | 1046700 | A2 | 10/2000 |
| EP | 1870706 | A1 | 12/2007 |
| EP | 2687582 | A1 | 1/2014 |
| EP | 2716743 | A1 | 4/2014 |
| JP | 57140791 | A * | 8/1982 ............ C07F 11/00 |
| JP | H0646243 | U | 6/1994 |
| JP | 2010510645 | A * | 4/2010 ............ H10K 30/81 |
| WO | 96/06899 | A1 | 3/1996 |
| WO | 98/33869 | A1 | 8/1998 |
| WO | 2011/161982 | A1 | 12/2011 |
| WO | 2020/105702 | A1 | 5/2020 |
| WO | 2021/021888 | A1 | 2/2021 |
| WO | 2021/021891 | A1 | 2/2021 |
| WO | 2022/026434 | A1 | 2/2022 |
| WO | 2022/026436 | A1 | 2/2022 |

OTHER PUBLICATIONS

International Search Report for International Application No. PCT/US2020/044009, mailed on Oct. 14, 2020, 7 pages.

International Search Report for International Application No. PCT/US2020/044005, mailed on Oct. 13, 2020, 6 pages.

International Search Report for International Application No. PCT/US2021/043264, mailed on Nov. 10, 2021, 6 pages.

International Search Report for International Application No. PCT/US2021/043267, mailed on Oct. 28, 2021, 6 pages.

A. Morina, et al. (2006) "ZDDP and MoDTC interactions in boundary lubrication—The effect oftemperature and ZDDP/MoDTC ratio", Tribology International, 39:1545-1557.

Oung et al. (1998) "Mitigating steel corrosion in cooling water by molybdate based inhibitors", Corrosion Prevention and Control. 45. 156-162 (Abstract only).

O.P. Parenago, et al. (2017) "Sulfur-Containing Molybdenum Compounds as High-Performance Lubricant Additives (Review)", Petroleum Chemistry, 57(8):631-642.

T. Sakurai, et al. (1971) "The Synthesis of Di-u-thio-dithio-bis(dialkyldithiocarbamates) Dimolybdenum (V) and Their Effects on. Boundary Lubrication", Bulletin of The Japan Petroleum Institute, 13(2):243-249.

R. Sarin, et al. (1994) "Molybdenum dialkylphosphorodithioates:synthesis and performance evaluation as multifunctional additives for lubricants", Tribology International, 27(6):379-386.

Written Opinion for International Application No. PCT/US2020/044009, mailed on Oct. 14, 2020, 8 pages.

Written Opinion for International Application No. PCT/US2020/044005, mailed on Oct. 13, 2020, 8 pages.

Written Opinion for International Application No. PCT/US2021/043264, mailed on Nov. 10, 2021, 11 pages.

Written Opinion for International Application No. PCT/US2021/043267, mailed on Oct. 28, 2021, 9 pages.

L. Yan, et al. (2012) "Comparing tribological behaviors of sulfur- and phosphorus-free organomolybdenum additive with ZDDP and MoDTC", Tribology International, 53:150-158.

* cited by examiner

PHOSPHOROUS-FREE OIL SOLUBLE MOLYBDENUM COMPLEXES FOR HIGH TEMPERATURE NAPHTHENIC ACID CORROSION INHIBITION

CROSS REFERENCE TO RELATED APPLICATIONS

This application is a divisional of U.S. Ser. No. 17/443,591, filed Jul. 27, 2021, which claims the benefit of U.S. Provisional Patent Application Ser. No. 63/058,010, filed Jul. 29, 2020, the disclosures of which are incorporated in their entireties herein by reference for all purposes.

FIELD OF THE INVENTION

The application is directed at inhibiting high temperature corrosion.

BACKGROUND

High temperature corrosion (e.g., 175° C. to 600° C.) is a well-known problem in processing and refining crude oil and related fractions. The oil's acidity, which is caused primarily by high naphthenic acid levels, adds to the corrosion problem as does the presence of sulfur in the crude oil, which produces hydrogen sulfide or reactive sulfur species at higher temperatures.

Petroleum refineries that process high acid crudes use advances in metallurgical materials to address corrosion, whereas other petroleum refineries use corrosion inhibitors of various chemistries to prevent or reduce corrosion and its accompanying adverse effects.

However, these options are not without their problems. Therefore, there continues to be a need for corrosion inhibiting compositions and methods that are effective and minimize operating costs, particularly against naphthenic acids and reactive sulfur species at high temperature. There is also a need for corrosion inhibitors that have reduced phosphorus or no phosphorous. Phosphorus-containing complexes are known to impair the function of various catalysts used in the processing of crude oil.

SUMMARY

Described herein are compositions and methods for inhibiting high temperature corrosion in fluid sources comprising corrodents and at least a liquid hydrocarbon.

In one aspect of the application is a method of inhibiting corrosion comprising:
introducing into a fluid source containing corrodents a sulfur-containing molybdenum complex having the general formula selected from Formula I or II:

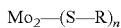

Formula I

Wherein R represents an oxygen, nitrogen or carbon-containing compounds such as alcohols, alkyl, alkenyl, amides, amines, or aryl groups; n is 4-10.

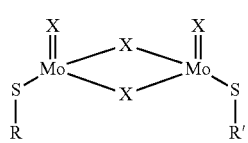

Formula II

R and R' each represents an oxygen, nitrogen or carbon-containing compounds such as alcohols, alkyl, alkenyl, amides, amines, or aryl groups; and X represents oxygen or sulfur and can be the same or different but where at least one X in the formula is sulfur.

In one aspect of the application is a composition comprising:
a sulfur-containing molybdenum complex to inhibit corrosion in a fluid source containing corrodents and in contact with a metal containment, the sulfur-containing molybdenum complex comprising the formula selected from Formula I or II:

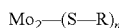

Formula I

Wherein R represents an oxygen, nitrogen or carbon-containing compounds such as alcohols, alkyl, alkenyl, amides, amines, or aryl groups; n is 4-10.

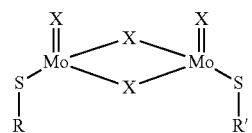

Formula II

R and R' each represents an oxygen, nitrogen or carbon-containing compounds such as alcohols, alkyl, alkenyl, amides, amines, or aryl groups; and X represents oxygen or sulfur and can be the same or different but where at least one X in the formula is sulfur.

In yet another aspect of the application is a treated metal containment comprising a metal containment comprising a metal surface; and the fluid source comprising the sulfur-containing molybdenum complex as described in Formula I, II, II and IV, wherein at least a portion of the metal surface is contacted by the fluid source.

The sulfur-containing molybdenum complex is used to inhibit corrosion of a metal containment comprising a fluid source comprising one or more corrodents, in particular corrodents with a high acidity and in process that include high temperatures (e.g., 175° C. to 600° C.).

DETAILED DESCRIPTION

Although the present disclosure provides references to various embodiments, persons skilled in the art will recognize that changes may be made in form and detail without departing from the spirit and scope of the specification. Various embodiments will be described in detail with reference to the figures. Reference to various embodiments does not limit the scope of the claims attached hereto. Additionally, any examples set forth in this specification are not intended to be limiting and merely set forth some of the many possible embodiments for the appended claims.

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent to those described herein can be used in practice or testing of the various embodiments of the present specification. All publications, patent applications, patents and other references mentioned herein are incorporated by reference in their entirety.

As used herein, the term "corrodents," are materials that cause, initiate, catalyze, accelerate, induce, or otherwise promote the corrosion of metals.

As used herein, the term "corrosion inhibitor" (CI) means a complex or mixture that prevents, retards, mitigates, reduces, controls, and/or delays corrosion.

As used herein, the term "fluid source" means any fluid source used in operations in the petroleum industries (viz., petroleum transport, storage, and refining) that contain one or more corrodents.

As used herein, the term "inhibits," "inhibiting," or grammatical equivalents thereof refer to preventing, retarding, mitigating, reducing, controlling and/or delaying corrosion.

The term "naphthenic acid" as used in connection with corrosion refers to monocyclic or bicyclic carboxylic acid(s) with a boiling range between 176° C. (350° F.) and 343° C. (650° F.). These acids tend to concentrate in the heavier fractions during crude oil distillation. Naphthenic acid is a collective term for certain organic acids present in various crude oils. Although there may be present minor amounts of other organic acids, it is understood that the majority of the acids in a naphthenic based crude are naphthenic in character, i.e., with a saturated ring, unsaturated ring, or aliphatic chain structure as follows:

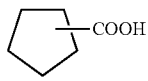

As used herein, the term "passivation" means the prevention of a reaction between two materials when used together by coating at least one of the two materials to such an extent that they become substantially less reactive relative to each other As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making complexes, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of" and includes "consisting of" "Consisting essentially of" and "consisting of" are construed as in U.S. patent law. For example, a solution that is "substantially free" of a specified complex or material may be free of that complex or material, or may have a minor amount of that complex or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of example, a disclosure in this specification of a range from 1 to 5 shall be considered to support claims to any of the following ranges: 1-5; 1-4; 1-3; 1-2; 2-5; 2-4; 2-3; 3-5; 3-4; and 4-5 and anything there between.

Described are compositions and methods to inhibit corrosion in hydrocarbon fluid sources that are formed during crude oil refining processes; especially, processing and refining of oils at temperatures in the range from about 175° C. to about 600° C., and that have corrodents. The acidity may be due to the presence of naphthenic acid, sulfur compounds, or both. Corrosion is extremely aggressive and difficult to inhibit in the presence of the naphthenic acid, sulfur, at high temperature or a combination thereof.

The compositions may be applied to one or more liquid hydrocarbon products to inhibit or reduce corrosion in petroleum transport, storage, and refining equipment such as pipes, transfer lines, valves, and the like. The corrosion inhibiting composition includes at least one sulfur-containing molybdenum complex. The sulfur-containing molybdenum complex contains at least one molybdenum center that is coordinated to sulfur, oxygen bearing ligands, thiolates, sulfides, thiocarbamates, thiocarbonates, thioacids, or polymers thereof and combinations thereof. In some embodiments, the sulfur-containing molybdenum complex is a metal containing complex. The described compositions and methods inhibit corrosion by serving as a corrosion inhibitor, or to passivate a surface against corrosion or both.

In some embodiments, the sulfur-containing molybdenum complex has the general formula of Formula I or Formula II.

$$Mo_2-(S-R)_n \quad \text{Formula I}$$

Wherein Mo is molybdenum complex, S is sulfur, R represents oxygen, nitrogen or carbon-containing ligands such as alcohols, alkyl, alkenyl, amides, amines, or aryl groups; and n is 2-10 or 4-10 or 2-6.

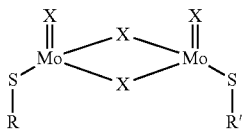

Formula II

Wherein R and R' each represents oxygen, nitrogen or carbon-containing ligands such as alcohols, alkyl, alkenyl, amides, amines, or aryl groups, and R and R' can be the same or different; and X represents oxygen or sulfur and can be the same or different but where at least one X in the formula is sulfur.

In some embodiments, R or R' represents an alkyl group (linear, branched, or cyclic) with or without saturation or heteroatoms or both; thiols, sulfides, thiocarbamates, thiocarbonates, thioacids, aromatic rings with or without substituents, organic polysulfides, or inorganic polysulfides.

In some embodiments, R and R', are each an alkyl group having 2 to 30 carbon atoms; 5 to 20 carbon atoms; 5 to 15 carbon atoms; 5 to 10 carbon atoms or an aryl group (including alkylaryl group). In some embodiments the number of carbon atoms described above is characterized by one or more hydroxyl groups (e.g., alkyl alcohols), acids or esters thereof. In some embodiments, the alkyl group is ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, cyclohexyl, phenyl, naphthyl, tolyl, xylyl, benzyl, and phenethyl groups. These alkyl groups may be primary, secondary, or tertiary alkyl groups and straight-chain or branched. In some embodiments the (alkyl)aryl groups include phenyl, tolyl, ethylphenyl, propylphenyl, butylphenyl, pentylphenyl, hexylphenyl, octylphenyl, nonylphenyl, decylphenyl, undecylphenyl, dodecylphenyl groups, all of which alkyl groups may be primary, secondary, or tertiary alkyl groups and straight-chain or branched. Furthermore, the (alkyl)aryl groups include all positional isomers wherein the aryl group may possess an alkyl substituent at any position. In some embodiments, the (alkyl) aryl groups described above are composed of carbon and hydrogen, and heteroatoms such as nitrogen, oxygen, and sulfur.

In some embodiments, the alcohol groups may be monosubstituted alcohols, diols or bis-alcohols, or polyalcohols. In some embodiments the alcohols are six to ten carbon atoms.

In some embodiments, the amino groups may be monoamines, diamines, or polyamines. In some embodiments, the amine is a dialkyl amine with the formula HNR5R6, where R5 and R6 are each selected from straight or branched chains containing 2 to 24 carbon atoms, or from 4-13; 8 to 13; or 10 to 20 carbon atoms. R5 can be the same or different from R6. In some embodiments, the R5 and R6 can be an aryl group including an (alkyl)aryl group. In some embodiments the alkyl group is ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl groups. These alkyl groups may be primary, secondary, or tertiary alkyl groups and straight-chain or branched. The alkyl groups may be straight-chain or branched and the alkyl groups may bond to any position of the phenyl groups, and mixtures thereof.

Other molybdenum complexes are sulfur-containing molybdenum dithiolates, molybdenum dithioester, or molybdenum thio-terminated amide complexes.

In some embodiments R and R' can be 1-4 rings or an aromatic group.

In some embodiments, the sulfur-containing molybdenum complex has the following general formula III:

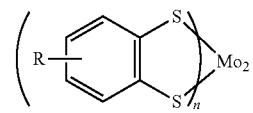

Formula III

Wherein R is as described above. In some embodiments, the R is an alkyl group (linear, branched, or cyclic) with or without saturation or heteroatoms or both; thiolates, sulfides, dithiocarbamates, dithiocarbonates, dithioacids, aromatic rings with or without substituents, organic polysulfides, inorganic polysulfides and n is 2-10 or 2-6.

In some embodiments the R in the sulfur-containing molybdenum is a phenolic containing sulfur. In some embodiments the phenolic containing sulfur is an ethylhexal phenol; 4,4'-thiobis(2-methyl-6-tert-butylphenol), 4,4'-thiobis(3-methyl-6-tert-butylphenol), 2,2'-thiobis(4-methyl-6-tert-butylphenol), bis(3-methyl-4-hydroxy-5-tert-butylbenzyl)sulfide, bis(3,5-di-tert-butyl-4-hydroxybenzyl)sulfide and 2,2'-thio-diethylenebis[3-(3,5-di-tert-butyl-4-hydroxyphenyl)propionate].

In some embodiments R and R' are each organic polysulfides or inorganic polysulfides. The inorganic polysulfide has 2-10 or 2-8 or 3-7 sulfurs. In some embodiments the organic polysulfide has the general formula IV:

 $R^2—Sx-R^3$   Formula IV

Wherein $R^2$ and $R^3$ are each as described above for R and R'. In some embodiments $R^2$ and $R^3$ are each an alkyl groups (aliphatic, acyclic, aromatic and heterocyclic groups) and $R^2$ and R3 can be the same or different; and x ranges from 2 to 8.

In some embodiments, the polysulfide is a di-(2ethylhexyl) polysulfide, dibenzylpolysulfide, di-tert-nonylpolysulfide, didodecylpolysulfide, di-tert-butylpolysulfide, dioctylpolysulfide, diphenylpolysulfide, and dicyclohexylpolysulfide.

In other embodiments, the R, R', R2, and R3 are methyl, ethyl, n-propyl, isopropyl, n-butyl, isobutyl, sec-butyl, tert-butyl, pentyls, hexyls, heptyls, octyls, nonyls, decyls, dodecyls, cyclohexyl, phenyl, naphthyl, tolyl, xylyl, benzyl, phenethyl, ethylhexyl of thiolates, thiocarbamates, thiocarbonates, thioacids and mixtures thereof.

In some embodiments the inorganic polysulfide is from S2 through S8.

In some embodiments the sulfur-containing Mo complex is as shown below.

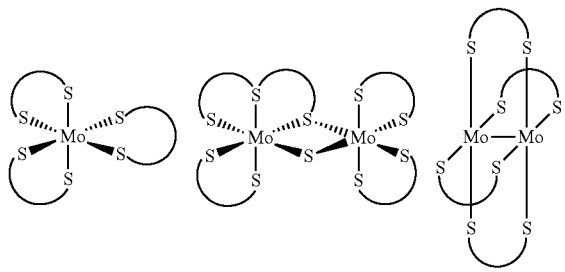

Wherein the arcs represent alkyl chains (linear, branched and cyclic) with or without saturation or heteroatoms or both; dithiocarbamates, dithiocarbonates, dithioacids, aromatic rings with or without substituents, organic polysulfides, or inorganic polysulfides.

In some embodiments the R, R', R2, and R3 in the sulfur-containing molybdenum complex are thiolates, thiocarbamates, thiocarbonates, thioacids, dithiolates, dithiocarbamates, dithiocarbonates, dithioacids, polymers thereof and mixtures thereof.

In some embodiments, the R, R', R2, and R3 in the sulfur-containing molybdenum complex is a diethyldithiocarbamate, dipropyldithiocarbamate, dibutyldithiocarbamate, dipentyldithiocarbamate, dihexyldithiocarbamate, dioctyldithiocarbamate, didecyldithiocarbamate, didodecyldithiocarbamate, di(butylphenyl)dithiocarbamate, di(nonylphenyl)dithiocarbamate, or di(2-ethylhexyl)dithiocarbamate or mixtures thereof.

In some embodiments, the sulfur-containing molybdenum complex is phosphorous-free or has little or no phosphorus. Such a complex provides a longer life for catalysts used in hydrocarbon-treating processes.

Any method known to one skilled in the art may be used to prepare the sulfur-containing molybdenum complexes. For example, the sulfur-containing molybdenum complex may be prepared as described in Tribology International Vol. 27, Issue 6, p. 379-386 (1994); Tribology International Vol. 53, p. 150-158 (2012); and U.S. Pat. No. 3,356,702, the references incorporated herein by reference in their entireties.

For example, molybdenum compounds of various oxidation states such as from 2-6 may be used and can be represented by the following compositions: molybdic acid, ammonium molybdate, molybdenum salts such as MoOCl4, MoO2Br2, Mo2O3Cl6, molybdenum trioxide or similar acidic molybdenum compounds. Acidic molybdenum compounds are molybdic acid, ammonium molybdate, and molybdenum trioxide. The molybdates include molybdenum oxide or molybdenum sulfide. The molybdates are reacted with a sulfur source. For example, the sulfur sources are sulfur, hydrogen sulfide, sulfur monochloride, sulfur dichloride, phosphorus pentasulfide, R2Sx where R is hydrocarbyl, preferably C1-40 alkyl, and x is at least 2, inorganic sulfides and polysulfides such as (NH4)2Sx, where x is at least 1, thioacetamide, thiourea, and mercaptans of the formula RSH where R is as defined above. Also, useful as sulfurizing agents are traditional sulfur-containing antioxidants such as wax sulfides and polysulfides, olefins, carboxylic and esters and ester-olefins, and alkylphenols and the metal salts thereof.

The compositions and methods described herein are used to inhibit corrosion. In some embodiments, compositions comprise, consist essentially of, or consist of at least one of the described sulfur-containing molybdenum complexes used for corrosion inhibition.

The corrosion inhibiting activity of the sulfur-containing molybdenum complexes are especially useful in liquid hydrocarbons and petrochemicals during the processing thereof where the process temperature is elevated to about 175° C. to 600° C. In some embodiments, the sulfur-containing molybdenum complexes are used at process temperatures of 175° C. to 550° C.; 175° C. to 205° C.; 200° C. to 300° C.; or from 200° C. to 450° C.; or 250° C. to 350° C.

In some embodiments, the sulfur-containing molybdenum complexes are used to inhibit corrosion of metal containments or equipment that contacts fluid sources containing corrodents. In some embodiments, the sulfur-containing molybdenum complexes are used with a fluid source that is acidic. In some embodiments, the acidity is due at least in part by the presence of corrodents such as naphthenic acid or other similar organic acids or phenols such as cresylic acid. In some embodiments, the corrodents include naphthenic acid, sulfur (e.g. hydrogen sulfide, organic sulfides, mercaptans, or sulfur dioxide), carbon dioxide, oxygen, sodium chloride, calcium chloride, or a combination thereof. In some embodiments, the fluid source comprises water, gas, liquid hydrocarbon, or combinations thereof. In some embodiments, the fluid source is a non-aqueous liquid. In some embodiments, the fluid source is a gas oil and light lubricating oil fractions. In some embodiments, the sulfur-containing molybdenum complexes are used to inhibit corrosion of a fluid source that includes a gas oil and light lubricating oil fractions having corrodents that include naphthenic acid, sulfur (e.g., hydrogen sulfide, organic sulfides, mercaptans or sulfur dioxide), carbon dioxide, oxygen, sodium chloride, calcium chloride, or combination thereof and is at a temperature higher than 175° C.

In some embodiments, the method comprises introducing a corrosion inhibiting composition to metal containment or the metal surface. In some embodiments the metal surface (e.g., surfaces of metal pipes, tubes, tanks, and the like) is introduced with a composition that includes at least a sulfur-containing molybdenum complex. In some embodiments, the metal surface is any suitable metal or metal alloy. For example, the metal surface can include steel (including stainless steel, galvanized steel, hot dipped galvanized steel, electrogalvanized steel, annealed hot dipped galvanized steel, carbon steel (e.g. mild carbon steel)), nickel, titanium, tantalum, aluminum, copper, gold, silver, platinum, zinc, nickel titanium alloy (nitinol), an alloy of nickel, chromium, iron, iridium, tungsten, silicon, magnesium, tin, alloys of any of the foregoing metals, coatings containing any of the foregoing metals, and combinations thereof. In some embodiments, the metal surface is carbon (mild) steel or higher alloys.

In some embodiments, the metal containment is a tank, pipe, or other apparatus having a metal surface in contact with a fluid source, or potentially in contact with a fluid source, wherein the fluid source includes one or more corrodents and is at a temperature between 175° C. to 600° C. In other embodiments, sulfur-containing molybdenum complex is introduced into distillation columns, trays, piping (e.g., pumparound) and related equipment. In some embodiments, the sulfur-containing molybdenum complex is used to inhibit the corrosive effects of naphthenic acids, sulfur or both in distilling hydrocarbons without the need for expensive corrosion resistant alloys to be used in distillation columns, strippers, trays, pumparound piping, and related equipment.

While the gas oil and light lubricating oil fractions often contain naphthenic acid, which contributes to the corrosion problem and in which context the sulfur-containing molybdenum complex is described, the sulfur-containing molybdenum complexes are useful not only in inhibiting corrosion in a part of a refinery handling these petroleum intermediates but are useful throughout an oil refinery where acidic hydrocarbons are in contact with metal-containing surfaces (e.g. iron-containing surfaces) and at high temperatures of 175° C. 600° C.

In some embodiments, the corrosion inhibiting composition includes solvents suitable for formulation of the sulfur-containing molybdenum complex. In some embodiments, the solvents are water, brine, seawater, alcohols such as methanol, ethanol, isopropanol, n-propanol, n-butanol, isobutanol, sec-butanol, t-butanol or higher alcohols such as benzyl alcohol); ketones such as acetone, or methyl ethyl ketone (2-butanone); acetonitrile; esters such as ethyl acetate, propyl acetate and butyl acetate; ethers such as diethyl ether or higher, e.g. methyl t-butyl ether, glyme, diglyme, ethylene glycol monobutyl ether, ethylene diglycol ethyl ether, 1,4-dioxane and related; aromatics such as toluene, xylene(s), diethylbenzene, naphthalene, and related aromatics or refinery cuts (heavy aromatic naphtha, heavy aromatic distillates, and related); aliphatics such as pentane, hexane, heptane, octane, or refined gasoline; or several "green" solvents such as 2-methyltetrahydrofuran, furfural alcohol, and cyclopentylmethylether.

In some embodiments, the solvents suitable for formulation with the molybdenum-containing composition are aliphatic, such as pentane, hexane, cyclohexane, methylcyclohexane, heptane, decane, dodecane, and the like, and aromatics, such as toluene, xylene, heavy aromatic naphtha, diesel, fatty acid derivatives (acids, esters, amides), and the like.

In some embodiments the one or more solvents are 10 wt % to 99 wt % of the corrosion inhibiting composition; 1-25 wt %; 20-50 wt %; 30-75 wt %; 50-75%; 75-100 wt % of the corrosion inhibiting composition.

In some embodiments, the sulfur-containing molybdenum complexes are provided neat (viz., without a solvent).

In some embodiments, the sulfur-containing molybdenum complexes are provided as a concentrate. In some embodiments the method includes introducing a molybdenum-containing concentrate directly to a metal containment in an amount that results in 0.1 ppm to 10,000 ppm (by weight or by volume) of the sulfur-containing molybdenum complexes in the fluid source. In other embodiments the method further includes diluting a sulfur-containing molybdenum complex concentrate prior to the introducing. The diluting comprises, consists essentially of, or consists of combining a sulfur-containing molybdenum complex concentrate with a diluent, wherein the diluent comprises, consists essentially of, or consists of a hydrocarbon-based solvent, a hydrocarbon source, a hydrocarbon soluble solvent, or a mixture of two or more thereof; and optionally includes mixing the sulfur-containing molybdenum complex concentrate with the diluent prior to the introduction of the sulfur-containing molybdenum complexes to the fluid source.

In some embodiments, the pH of the fluid source is less than 7. In some embodiments, the pH of the fluid source is between about 1 and about 6, between 5 and 6, between 4 and 5, between 3 and 4, between 2 and 3, between 1 and 2, or between 0 and 1.

In some embodiments, various dosage amounts of the corrosion inhibiting composition and/or the sulfur-containing molybdenum complex are introduced to a fluid source to inhibit corrosion of a metal containment in contact with the fluid source. The most effective corrosion inhibitor amount or mixture of inhibitors to be used can vary, depending on the local operating conditions, the particular hydrocarbon being processed, the temperature and other characteristics of the acid corrosion system can have a bearing on the amount of the corrosion inhibitor or mixture of corrosion inhibitors to be used. One of ordinary skill in the art is able to calculate the amount of the sulfur-containing molybdenum complex or composition comprising sulfur-containing molybdenum complex for a given situation without undue experimentation. Other factors that would be considered important in such calculations include, for example, content of corrodents in fluid source, naphthenic acid amount, or acid, and similar parameters.

In some embodiments, the composition comprising the sulfur-containing molybdenum complex is applied to a fluid source that contains various acid levels. In some embodiments, the hydrocarbon contains naphthenic acids.

A method used to determine the acid concentration in crude oil has been a potassium hydroxide (KOH) titration of the oil. The oil is titrated with KOH, a strong base, to an end point which assures that all acids in the sample have been neutralized. The unit of this titration is mg of KOH/gram of sample and is referred to as the "Total Acid Number" (TAN) or Neutralization Number. Both terms are used interchangeably in the application.

The unit of TAN is commonly used since it is not possible to calculate the acidity of the oil in terms of moles of acid, or any other of the usual analytical terms for acid content. In some embodiments, naphthenic acid corrosion occurs when the crude being processed has a TAN above 0.2. In some embodiments, the sulfur-containing molybdenum complex is used with a fluid source (e.g., hydrocarbon) with TAN of 0.2 to 20. In some embodiments the fluid source has a TAN of 0.2 to 0.5; 0.5 to 5; 2 to 10; 7 to 15; 10 to 15; 15 to 20.

In some embodiments, the sulfur-containing molybdenum complexes or in a composition is applied to a fluid source that contains various sulfur levels. In one embodiment, the fluid source has about 0.1% to about 25%; about 0.1 to about 10%; about 1% to about 10%; or about 6% to about 25% weight/weight (w/w) sulfur.

In some embodiments, the sulfur-containing molybdenum complexes or in a composition are used in an amount from about 0.1 ppm to 10,000 ppm; from 0.1 ppm to 3,000 ppm; from about 100 ppm to 1000 ppm; from about 500 ppm to 3,000 ppm; from about 750 ppm to 3,000 ppm; from about 2,000 ppm to 5,000 ppm; from about 3,000 ppm to 5000 ppm; from about 100 ppm to 3,000 ppm; from about 1 ppm to 1000 ppm; from about 1 ppm to 3,000 ppm; from about 10 ppm to 50 ppm; from about 50 ppm to 100 ppm, from 100 ppm to 800 ppm, from 150 ppm to 550 ppm; from about 1 ppm to 250 ppm; from about 1 ppm to 50 ppm; from about 1 ppm to 25 ppm; from about 1 ppm to 5 ppm; from about 3 ppm to 25 ppm; from 0.1 ppm to 5 ppm; or from about 0.1 ppm to 1 ppm by weight or volume of the sulfur-containing molybdenum complex in a fluid source.

In some embodiments, the sulfur-containing molybdenum complexes are introduced at an initial dosage rate of about 1 ppm to about 3,000 ppm and to maintain this level for a time period ranging from 1 hour to 48 hours until the sulfur-containing molybdenum complexes induces the build-up of a corrosion protective coating on the metal surfaces. In other embodiments, the sulfur-containing molybdenum complex is dosed at a concentration that is at least double the initial dosage rate of 1 ppm to about 3,000 ppm for a period of 1 hour to several hours prior to introducing TAN-containing fluids. Once the protective surface is established, the dosage rate needed to maintain the protection may be reduced to at least 1-250 ppm without substantial sacrifice of protection. In other embodiments, the sulfur-containing molybdenum complexes is dosed at a concentration that is at least double the initial dosage rate for a period of one hour to several hours while simultaneously introducing TAN-containing fluids.

Once the protective surface is established, the dosage rate needed to maintain the protection may be reduced from 1 ppm to 3000 ppm or at least 1 ppm to 1,000 ppm. In some embodiments the dosage for a continuous application of the sulfur-containing molybdenum complex into the fluid is 1 ppm-1000 ppm; 1-500 ppm, 1-250 ppm, 100-100 ppm, or 500-1000 ppm without substantial sacrifice of protection.

In some embodiments, the sulfur-containing molybdenum complexes provides from about 50-99%, 75-99%, or 75-50% corrosion inhibition for metal containment in contact with a fluid source. In some embodiments, the sulfur-containing molybdenum complexes provides from about 50-99% corrosion protection for a metal containment in contact with a fluid source, as determined by a 1018 carbon steel coupon in a coupon test as described in Examples 1-2. In some embodiments, the method provides at least 70% corrosion protection for a 1018 carbon steel coupon test, from about 70-90%, 75-85% or 80-90% wherein the test is characterized by a testing temperature of about 250° C. to 350° C.; a naphthenic acid in paraffin oil with KOH of about 0.5-12 TAN; a test duration of 2-4 hours; and a corrosion inhibitor dosage of 25 ppm, 50 ppm, 75 ppm, 100 ppm, 175 ppm, 200 ppm, 250 ppm, 300 ppm, 350 ppm, 400 ppm, 500 ppm, or 1,000 ppm, based on total fluid volume.

In some embodiments, the method provides at least 65% protection, from about 65-80%, 70-90%, 75-85% or 80-90% after two hours, at least 85% protection after 8 hours, and about 100% protection 10 hours.

In some embodiments, the sulfur-containing molybdenum complex or compositions containing them include other additives such as one or more asphaltene inhibitors, paraffin inhibitors, dispersants, emulsion breakers, antifoams, or any combination thereof. In some embodiments, the sulfur-containing molybdenum complex further comprises one or more solvents or a mixture thereof.

In some embodiments the sulfur-containing molybdenum complex is introduced into a fluid source by any means suitable for ensuring dispersal of the sulfur-containing molybdenum complex through the fluid source being treated and introduced at numerous, different locations throughout a given system. The composition comprising the sulfur-containing molybdenum complex can be injected as prepared or formulated in one or more additional solvents, depending upon the application and requirements.

In one embodiment, the composition comprising the molybdenum-containing chemistry is pumped into an oil/gas pipeline using an umbilical line. In some embodiments, capillary string injection systems may be utilized to deliver the composition. U.S. Pat. No. 7,311,144 provides a description of an apparatus and methods relating to capillary injection, the disclosure of which is incorporated into the present application in its entirety. In other embodiments, the composition comprising the one or more sulfur-containing molybdenum complex is injected using mechanical equipment such as chemical injection pumps, piping tees, injection fittings, and the like.

Introducing may be achieved also by mixing, blending with mechanical mixing equipment or devices, stationary mixing setup or equipment, magnetic mixing or other suitable methods, other equipment and means known to one skilled in the art and combinations thereof to provide adequate contact and/or dispersion of the composition into the fluid source. The contacting can be made in-line and/or offline. The various components of the composition may be mixed prior to and/or during contact. If needed or desired, the composition or some of its components may be optionally removed or separated mechanically, chemically, or by other methods known to one skilled in the art. One of skill in the art will understand that the methods disclosed herein are not limited in any way by the introduction method, the timing, or the location of the introduction.

The molybdenum complexes are used in a method to passivate the surfaces of a process equipment to provide a treated process equipment. The treated process equipment mitigates the corrosion on the metal surfaces. Examples of passivation are described in U.S. Pat. Nos. 4,024,050, 3,522, 093, 6,228,253, 9,845,437, ASTM A-967, and ASTM A-380, which references are incorporated herein by reference in their entirety. In some embodiments, passivation is carried out before the process equipment is used for processing and/or after the process equipment has been cleaned, and referred herein as pre-passivation.

In some embodiments, the sulfur-containing molybdenum complexes is introduced into the hydrocarbon feedstock before or during the processing of the hydrocarbon feedstock, and referred here as passivation. In the method to pre-passivate or passivate, in some embodiments, the molybdenum complex is introduced continuously or intermittently.

In some embodiments the sulfur-containing molybdenum complex is used with water strippers and waste water strippers, used with petrochemical processes such as styrene, butadiene, acrylonitrile, and ethylene processes. In some embodiments, ethylene acid gas scrubbers and butadiene solvent recovery systems are also end-use applications of the sulfur-containing molybdenum complex.

The sulfur-containing molybdenum complexes are not used in processing equipment such as an engine, hydraulic brake, power steering system, or transmission nor are the sulfur-containing molybdenum complexes used as a coolant additive in hydraulic fluid.

The sulfur-containing molybdenum complexes are also useful as corrosion inhibitors for other industrial systems. In some embodiments, the sulfur-containing molybdenum complexes are used as disclosed in U.S. Provisional Application No. 63/058,023 filed Jul. 29, 2020.

In some embodiments, the sulfur-containing molybdenum complexes are used in metallurgical industry, mining systems, water reclamation systems, water purification systems, food processing systems (meat, fruit and vegetable), waste treatment systems, municipal sewage and water treatment systems.

Further non-limiting embodiments are disclosed below:
1. A method of inhibiting corrosion comprising:
   introducing into a fluid source containing corrodents a sulfur-containing molybdenum complex having the general formula selected from Formula I or II:

$$Mo_2-(S-R)_n \hspace{2cm} \text{Formula I}$$

Wherein R represents an oxygen, nitrogen or carbon-containing compounds such as alcohols, alkyl, alkenyl, amides, amines, or aryl groups; n is 4-10.

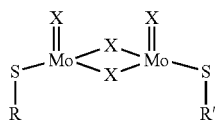

Formula II

R and R' each represents an oxygen, nitrogen or carbon-containing compounds such as alcohols, alkyl, alkenyl, amides, amines, or aryl groups; and X represents oxygen or sulfur and can be the same or different but where at least one X in the formula is sulfur.

2. The method of embodiment 1, wherein the introducing is by injecting or pumping.

3. The method as in one of embodiments 1-2, wherein the fluid source contacts a metal containment.

4. The method as in one of embodiments 1-3, wherein the fluid source is in contact with distillation columns, strippers, trays, or piping.

5. The method as in one of embodiments 1-4, wherein the fluid source comprises a liquid hydrocarbon fraction.

6. The method of embodiment 5, wherein the hydrocarbon fraction is a distillate.

7. The method as in one of embodiments 1-6, wherein the corrodents comprise naphthenic acid, sulfur or combinations thereof.

8. The method as in one of embodiments 1-7, wherein the fluid source comprises a TAN of 0.2 to 20.

9. The method as in one of embodiments 1-8, wherein the fluid source temperature is about 175° C. to 600° C.

10. The method as in one of embodiments 1-9, wherein the sulfur-containing molybdenum complex is added to the fluid source from 1 ppm to 3,000 ppm.

11. The method as in one of embodiments 1-10, wherein the sulfur-containing molybdenum complex further comprises one or more, asphaltene inhibitors, paraffin inhibitors, dispersants, emulsion breakers, or any combination thereof.

12. The method as in one of embodiments 1-11, wherein the sulfur-containing molybdenum complex has the general formula III:

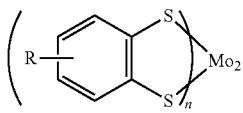

Formula III

Wherein R represents an oxygen, nitrogen or carbon-containing compounds such as alcohols, alkyl, alkenyl, amides, amines, or aryl groups; n is 2-6.

13. The method as in one of embodiments 1-12, wherein the R, R' comprise each an alkyl group (linear, branched, or cyclic) with or without saturation or heteroatoms or both; thiolates, sulfides, thiocarbamates, thiocarbonates, thioacids, aromatic rings with or without substituents, organic polysulfides, inorganic polysulfides, polymers thereof and combinations thereof.

14. The method as in one of embodiments 1-13, wherein the R, R' comprise each disulfides, dithiolates, dithiocarbamates, dithiocarbonates, dithioacids, inorganic polysulfides, organic polysulfides, polymers thereof and mixtures thereof.

15. The method of embodiment 14, wherein the organic polysulfide has the general formula IV:

R2-Sx-R3   Formula IV

Wherein R2 and R3 each represents an oxygen, nitrogen or carbon-containing ligands such as alcohols, alkyl, alkenyl, amides, amines, or aryl groups; and R2 and R3 can be the same or different.

16. The method of embodiment 15, wherein the R2 and R3 comprise each an alkyl group (linear, branched, or cyclic) with or without saturation or heteroatoms or both; thiolates, sulfides, thiocarbamates, thiocarbonates, thioacids, aromatic rings with or without substituents, organic polysulfides, inorganic polysulfides, polymers thereof and combinations thereof.

17. The method as in one of embodiments 15-16, wherein the R2 and R3 comprise each an alkyl group (linear, branched, or cyclic) with or without saturation or heteroatoms or both; thiolates, sulfides, thiocarbamates, thiocarbonates, thioacids, aromatic rings with or without substituents, organic polysulfides, inorganic polysulfides, polymers thereof and combinations thereof.

18. The method as in one of embodiments 1-17, wherein the sulfur-containing molybdenum complex comprises the following:

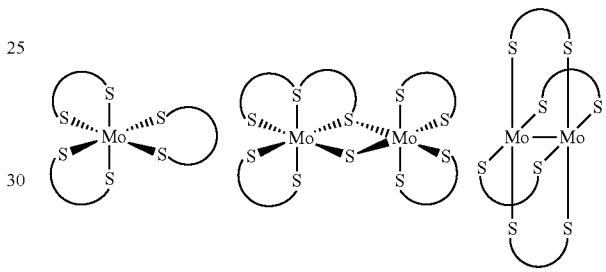

Wherein the arcs represent alkyl chains (linear, branched and cyclic) with or without saturation or heteroatoms or both; thiolates, sulfides, thiocarbamates, thiocarbonates, thioacids, aromatic rings with or without substituents, organic polysulfides, or inorganic polysulfides.

19. The method as in one of embodiments 1-18, wherein the sulfur-containing molybdenum complex provides at least 70% corrosion protection in a 1018 carbon steel coupon test.

20. A composition comprising a sulfur-containing molybdenum complex to inhibit corrosion in a fluid source containing corrodents and in contact with a metal containment, the sulfur-containing molybdenum complex comprising the formula selected from Formula I or II:

$Mo_2$—(S—R)$_n$   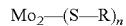Formula I

Wherein R represents an oxygen, nitrogen or carbon-containing compounds such as alcohols, alkyl, alkenyl, amides, amines, or aryl groups; n is 4-10.

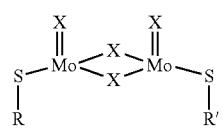

Formula II

R and R' each represents an oxygen, nitrogen or carbon-containing compounds such as alcohols, alkyl, alkenyl, amides, amines, or aryl groups; and X represents oxygen or sulfur and can be the same or different but where at least one X in the formula is sulfur.

21. The composition of embodiment 20, wherein the composition further comprises one or more, asphaltene inhibitors, paraffin inhibitors, dispersants, emulsion breakers, or any combination thereof.

22. The composition as in one of embodiments 20-21, wherein the fluid source is in contact with distillation columns, strippers, trays, or piping.

23. The composition as in one of embodiments 20-22, wherein the fluid source comprises at least a liquid hydrocarbon fraction.

24. The composition as in one of embodiments 20-23, wherein the hydrocarbon fraction is a distillate.

25. The composition as in one of embodiments 20-24, wherein the corrodents comprise naphthenic acid, sulfur, or combinations thereof.

26. The composition as in one of embodiments 20-25, wherein the fluid source comprises a TAN of 0.2-20.

27. The composition as in one of embodiments 20-26, wherein the fluid source temperature is 175° C. to 600° C.

28. The composition as in one of embodiments 20-27, wherein the sulfur-containing molybdenum complex has the general formula III:

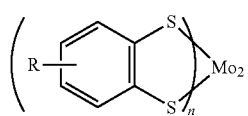

Formula III

Wherein R represents an oxygen, nitrogen or carbon-containing compounds such as alcohols, alkyl, alkenyl, amides, amines, or aryl groups; n is 2-6.

29. The composition as in one of embodiments 20-28, wherein the R, R' comprise each an alkyl group (linear, branched, or cyclic) with or without saturation or heteroatoms or both; thiolates, sulfides, thiocarbamates, thiocarbonates, thioacids, aromatic rings with or without substituents, organic polysulfides, inorganic polysulfides, polymers thereof and combinations thereof.

30. The composition as in one of embodiments 20-29, wherein the R, R' comprise each disulfides, dithiolates, dithiocarbamates, dithiocarbonates, dithioacids, inorganic polysulfides, organic polysulfides, polymers thereof and mixtures thereof.

31. The composition of embodiment 30, wherein the organic polysulfide has the general formula IV:

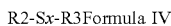

Formula IV

Wherein R2 and R3 each represents an oxygen, nitrogen or carbon-containing ligands such as alcohols, alkyl, alkenyl, amides, amines, or aryl groups; and R2 and R3 can be the same or different.

32. The composition of embodiment 31, wherein the R2 and R3 comprise each an alkyl group (linear, branched, or cyclic) with or without saturation or heteroatoms or both; thiolates, sulfides, thiocarbamates, thiocarbonates, thioacids, aromatic rings with or without substituents, organic polysulfides, inorganic polysulfides, polymers thereof and combinations thereof.

33. The composition as in one of embodiments 31-32, wherein the R2 and R3 comprise each an alkyl group (linear, branched, or cyclic) with or without saturation or heteroatoms or both; thiolates, sulfides, thiocarbamates, thiocarbonates, thioacids, aromatic rings with or without substituents, organic polysulfides, inorganic polysulfides, polymers thereof and combinations thereof.

34. The composition as in one of embodiments 20-33, wherein the sulfur-containing molybdenum complex comprises the following:

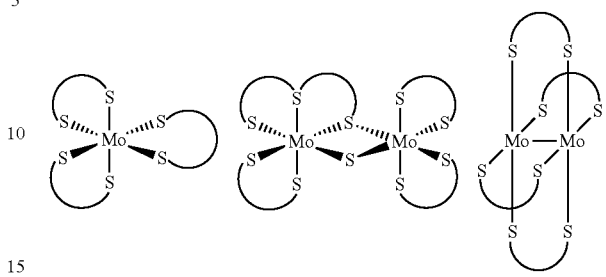

Wherein the arcs represent alkyl chains (linear, branched and cyclic) with or without saturation or heteroatoms or both; thiolates, sulfides, thiocarbamates, thiocarbonates, thioacids, aromatic rings with or without substituents, organic polysulfides, or inorganic polysulfides.

35. The composition as in one of embodiments 20-34, wherein the sulfur-containing molybdenum complexes are about 1 ppm to 3,000 ppm of the composition.

36. A composition comprising:
a fluid source; and at least one sulfur-containing molybdenum complex as in one of embodiments 20-35.

37. A treated metal containment comprising:
a metal containment comprising a metal surface; and the fluid source comprising the sulfur-containing molybdenum complex as in one of embodiments 20-36, wherein at least a portion of the metal surface is contacted by the fluid source.

38. The treated metal containment of embodiment 37, wherein the metal surface comprises carbon (mild) steel or higher alloy.

39. The treated metal containment as in one of embodiments 37-38, wherein the metal containment comprises a tank, pipe, distillation column strippers, trays, or piping.

40. The treated metal containment as in one of embodiments 37-39, wherein the fluid comprises, gas, liquid hydrocarbon, and optionally water.

41. Use of the sulfur-containing molybdenum complex as in one of embodiments 1-40 to inhibit corrosion.

42. Use of the sulfur-containing molybdenum complex as in one of embodiments 1-40 to treat a fluid source comprising one or more corrodents and the fluid source in contact with a containment.

43. Use of the sulfur-containing molybdenum complex as in one of embodiments 1-40 to inhibit corrosion of a metal containment comprising a fluid source comprising one or more corrodents.

EXAMPLES

The following examples are intended to illustrate different aspects and embodiments of the application may be made to and are not to be considered limiting. It will be recognized that various modifications and changes the experimental embodiments described herein, and without departing from the scope of the claims.

Example 1—High Temperature Corrosion Inhibition (Prophetic)

The performance of the test complexes will be evaluated via weight loss analysis (corrosion rate) of coupons using the autoclave corrosion testing method.

Table 1 shows the experimental parameters that will be used in high temperature corrosion testing:

TABLE 1

Experimental Parameters that will be used in High Temperature Corrosion Testing

| Experimental Variable | Parameter |
|---|---|
| Temperature | 320° C. |
| Shear rate | 440 rpm after the temperature reaches 320° C. |
| Reaction $N_2$ pressure | 100 PSI @room temperature and ~220 PSI @320° C. |
| Time | 4 hours |
| Autoclave testing medium | Naphthenic acid in paraffin oil (both from Sigma Aldrich) |
| TAN | 11.5 |
| C1018 Metal Coupons | Disc coupons with 1.25-inch diameter and 0.125-inch thickness |
| Pre-passivation dose | 1000 ppm |
| Autoclave inhibitor dose (continuous) | 500, 350, 250, and 175 ppm |

Coupon Pre-Passivation Step 500 mL of paraffin oil solution will be placed in a 1 L glass reactor. The paraffin oil solution will be heated to 250° C. to which a 1,000 ppm dose of each of the corrosion inhibitors being tested was injected into, and the resulting paraffin oil solution will be stirred at 250° C. for 1 hour.

The metal coupons will be first weighed on an analytical balance (four-decimal). The metal coupons will be then immersed in the paraffin oil that was heated at 250° C. and subjected to continuous nitrogen purging. After 1-hour of passivation, heating will be stopped. Once the oil is cooled down (≤80oC), the coupons will be removed from the oil, washed with toluene and isopropanol, and dried using a nitrogen gas stream.

Autoclave Corrosion Testing

In a 1 L autoclave vessel, a 500 mL solution of paraffin oil (with 11.5 TAN) will be added. Pre-passivated C1018 coupons (as described above) will be weighed on an analytical balance (four-decimal) and attached to a rotating shaft of the autoclave vessel via a set of ceramic spacers that will be held together by a screw. Subsequently, the vessel will be sealed and tightened using a set of bolts/screws. The atmosphere inside the vessel will be first purged with $N_2$ using three rounds of 100 psi $N_2$ fills/releases. The reactor was then pressurized with $N_2$ to 100 psi and then inserted inside a heating element or mantle. The system was set to rotate at 50 rpm while the vessel was heating to 320° C. Once the target temperature of 320° C. was reached, the rotation rate was increased to 440 rpm and the experiment was run for 4 hours.

Subsequently, the heating mantle will be turned off and the motor speed will be reduced to 50 rpm. The vessel will be allowed to cool for 30 minutes. When the vessel temperature dropped below 150° C., the autoclave will be removed from the heating mantle and allowed to cool further inside a hood. Once the vessel temperature dropped below 70° C., the pressure inside the vessel will be released, and the coupons were then removed, will be rinsed with toluene, and scrubbed with a multipurpose paper towel. The coupons were then rinsed with toluene, isopropanol, and dried using a stream of $N_2$ gas. The dried coupons were weighed using the same analytical balance used to initially weight pre-passivated C1018 coupons, and the corrosion rate will be calculated using equation 1. The vessel will then be cleaned with toluene, isopropanol, and dried in an oven.

The corrosion rate or weight loss is calculated using Equation 1:

$$\text{Corrosion Rate} = \frac{3.45 \times 10^6 \times (\Delta W)}{A \times T \times D} \quad \text{Equation 1}$$

Where
$\Delta W$=weight loss in grams
A=area in $cm^2$,
T=time in hours, and
D=density of the metal in $g/cm^3$ A dose response profile will be tested as described above for the following sulfur-containing molybdenum complexes: a sulfur-containing Mo thiolate; a sulfur-containing Mo dialkyldithiocarbamate; a sulfur-containing Mo dialkyldithiocarbonate; a sulfur-containing Mo dialkyldithioacid and a sulfur-containing Mo polysulfide compared to Comparative Compounds such as a mixture of a mono- and di-alkyl phosphate ester or an organic polysulfide or an inorganic polysulfide; or a thiolate in dose ranges from 100-800 ppm.

Example 2 (Prophetic)

The performance of the sulfur-containing molybdenum test complexes (as described in Example 1) will be compared to sulfur-based products in a manner as described in Example 1. The sulfur-based products to be tested will be compared to Comparative Compounds such as a branched alkyl-terminated polysulfide compound; n-alkane-terminated polysulfide compound; known industry standard inhibitors, such as a phosphate ester. Blank is the sample with no test complex or comparative compounds.

What is claimed is:

1. A method of inhibiting corrosion of a metal surface that is contacted by a hydrocarbon fluid source containing acidic corrodents, comprising:
introducing into the hydrocarbon fluid source containing acidic corrodents a phosphorus-free, sulfur-containing molybdenum complex having the general formula selected from Formula I:

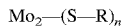 Formula I $Mo_2$—(S—R)$_n$ wherein each R of Formula I represents an oxygen, nitrogen or carbon-containing group; and n is 4-10.

2. The method of claim 1, wherein the hydrocarbon fluid source comprises a liquid hydrocarbon fraction.

3. The method of claim 1, wherein the hydrocarbon fluid source comprises crude oil.

4. The method of claim 1, wherein the acidic corrodents comprise a corrodent selected from the group consisting of naphthenic acid, sulfur or combinations thereof.

5. The method of claim 1, wherein the acidic corrodents comprise a naphthenic acid.

6. The method of claim 1, wherein the hydrocarbon fluid source comprises a total acid number (TAN) of 0.2 to 20 or the hydrocarbon fluid source has a temperature that is about 175° C. to 600° C.

7. The method of claim 1, wherein R is an alkyl group comprising one or more hydroxyl groups.

8. The method of claim 1, wherein at least one R is an alkyl group.

9. The method of claim 8, wherein the alkyl group has 2 to 30 carbon atoms.

10. The method of claim 8, wherein the alkyl group has 5 to 10 carbon atoms.

11. The method of claim 1, wherein at least one R is an alkenyl group.

12. The method of claim 1, wherein at least one R is an aryl group.

13. The method of claim 12, wherein the aryl group is substituted.

14. The method of claim 1, wherein the phosphorus-free, sulfur-containing molybdenum complex is introduced into a distillation column.

15. The method of claim 1, wherein the introducing step comprises introducing a composition into the hydrocarbon fluid source, wherein the composition comprises the phosphorus-free, sulfur-containing molybdenum complex and one or more other additives.

16. The method of claim 15, wherein the one or more other additives comprise an asphaltene inhibitor.

17. The method of claim 15, wherein the one or more other additives comprise a paraffin inhibitor.

18. The method of claim 15, wherein the one or more other additives comprise a dispersant.

\* \* \* \* \*